Dec. 27, 1932.   O. GOLDKAMP   1,892,513
GAS METER
Filed Jan. 21, 1929
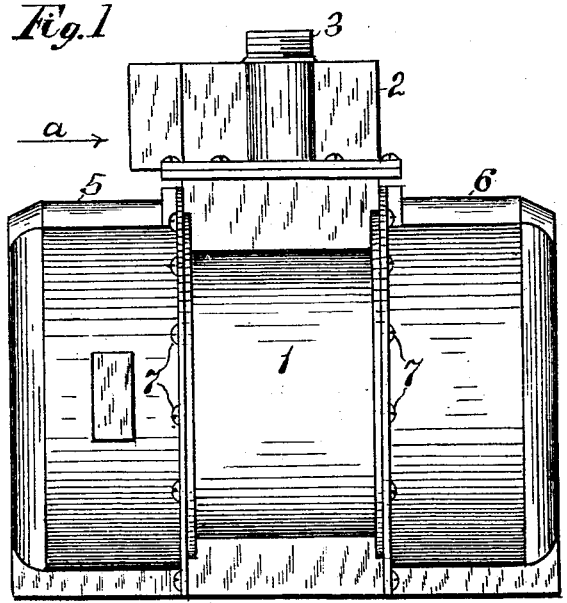
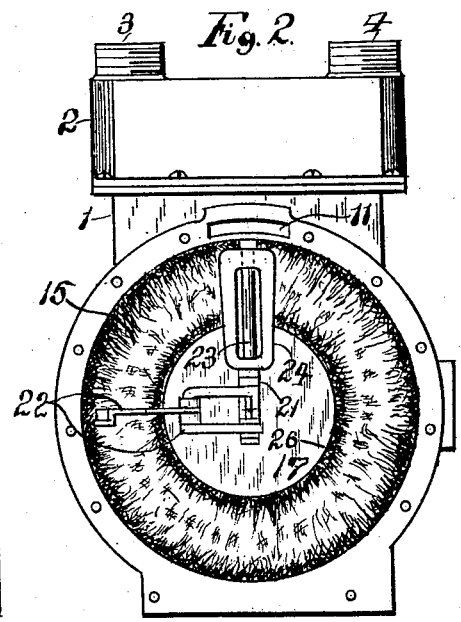
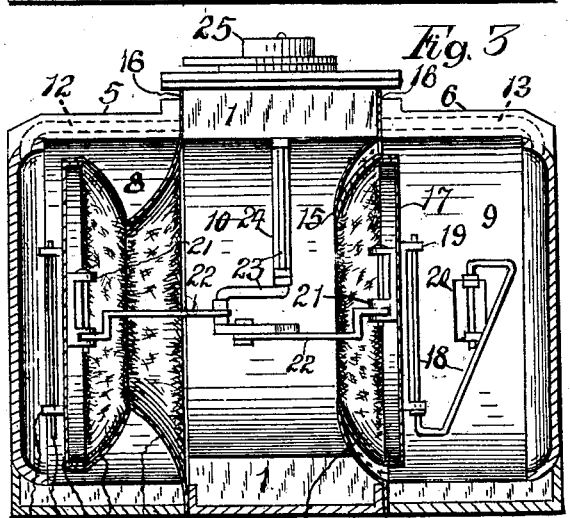
INVENTOR
Otto Goldkamp,
BY Geo. D. Phillips
ATTORNEY Patented Dec. 27, 1932

1,892,513

UNITED STATES PATENT OFFICE

OTTO GOLDKAMP, OF SAN DIEGO, CALIFORNIA, ASSIGNOR TO THE SPRAGUE METER COMPANY, OF BRIDGEPORT, CONNECTICUT

GAS METER

Application filed January 21, 1929. Serial No. 333,799.

My invention relates to gas meters having a body with a central gas measuring chamber and side gas measuring chambers opening into the central chamber and of equal diameter therewith. Gas meters are often installed in very limited spaces, and after their installation they are found to be of insufficient capacity, and to install a larger meter of greater capacity into the same space is both difficult and expensive.

My object is to increase the gas displacement in all of the chambers without increasing their diameters or the height or width of the meter body. To this end I provide for this increased gas displacement by increasing the depth of the side covers and the stroke or travel of diaphragms having a novel construction. The diaphragms are each composed of two flexible units so constructed as to permit of one unit folding into the other unit on the inward travel and unfold or expand on the outward travel to conform to the increased gas displacement. The folding and unfolding of the diaphragms is, therefore, an essential feature in order to insure their long travel without buckling, or other like form of distortion that would interfere with their free movement back and forth. The amount of travel of the folded diaphragms in the several chambers represents the increased gas displacement in said chambers. By this increase of the gas displacement the capacity of the meter is correspondingly increased while the diameter of the meter and its several chambers remain unchanged.

In describing the invention in detail, reference will be had to the accompanying drawing wherein like characters of reference denote corresponding parts in the several views in which Figure 1 represents a side elevation of the gas meter—

Figure 2 is a front elevation of the meter looking in the direction of arrow $a$, Figure 1, with one of the side covers removed—

Figure 3 is a longitudinal central sectional view of parts of the central and side gas chambers minus the gas distributing chamber—

Figure 4 is a detail view of an unfolded diaphragm—

Figure 5 is a detail view of a collapsed or folded diaphragm, and central sectional view of the larger unit—

Figure 6 is a central sectional view of a folded diaphragm—

Figure 7 is a central sectional view of the larger diaphragm unit, and

Figure 8 is a central sectional view of the smaller diaphragm unit.

1 represents the conventional meter body with its gas distributing chamber 2, its gas inlet 3, and 4 is the gas outlet or exhaust from the meter.

5 and 6 are side covers removably secured to the central body 1 by screws 7, and 8, 9, are their gas measuring chambers opening into the central gas measuring chamber 10, all of which gas measuring chambers are of the same diameter.

The common gas port 11, Figure 2, and a similar one, not shown, on the opposite face of the meter body, conveys the gas from the distributing chamber 2 into the outer ends of the side chambers 8, 9, through the usual gas passages 12 and 13.

It is a simple matter to install a meter of greater capacity for one of less capacity where the meter space is ample for such an exchange, but where the meter space is limited to such an extent that this exchange cannot be made, I adjust the diaphragms to increase their travel and replace the present side covers with others of the same diameter but of increased lateral extension or depth sufficient to provide for an increased travel of the diaphragms proportionate to the increase of gas displacement required. I also substitute other diaphragms specially adapted for this increased travel.

The diaphragms indispensably connected with this increased travel are composed of the two flexible units 14 and 15. The latter and larger unit is suspended by its flange 16 between the meeting faces of the body 1 and the side covers 5 and 6. The smaller unit 14 is secured to the metal plate 17 and is maintained in perfect alinement with the larger unit 15 by means of the swinging lever 18 pivotally supported in the brackets 19 and 20. These folded diaphragms will not cramp or buckle in any of their extended travels within the capacity of the meter.

The conventional mechanism connecting the valves in the gas distributing chamber with reciprocating diaphragms, is herein represented by the brackets 21 secured to the inner faces of the metal plates 17 with the links 22 pivotally connected to said brackets and the central crank shaft 23 journaled in the vertical bracket 24. The crank shaft is connected in the usual manner with the valve 25, representing one of the many species of valves that may be used.

As shown in Figures 7 and 8, the diaphragm units are separated and each has a central opening 26 and 27 to admit gas from the central chamber and also to give entrance and free play for the crank shaft links 22. These units are then joined by the stitches 28, Figure 6, around the margins of said openings. The two units could be made of a single piece of flexible material, but no advantage would be gained over the method shown for uniting the two individual units. In either case, the central diameter, at the point 29, Figure 4, must necessarily be less than the diameters of the units to insure folding of the units without buckling.

In Figure 3 is clearly shown the operative effect of the device. The folded diaphragm from the gas measuring chamber 9, has, on its inward travel, been carried beyond its point of suspension well into the central measuring chamber 10, thus leaving the entire area of chamber 9 and the space represented by its travel into the chamber 10 for gas displacement.

To materially increase the travel of the ordinary single sheet diaphragm would result in more or less buckling or other like distortion which would operate against an even and steady travel of the diaphragm so necessary for a uniform amount of gas displacement. The two unit diaphragms will expand on their outward travel to increase the gas displacement in chamber 10, and will fold together and move as a single unit on their inward travel without distortion to provide for increased gas displacement in the side covers, thus assuring a uniform amount of gas displacement in all of the gas measuring chambers and without any change in the crank or links.

An economical advantage can thus readily be seen whereby a meter of inferior capacity, installed in a limited space, can be utilized for increased gas displacement without changing its height, width or diameter of its gas measuring chambers.

Having thus described my invention what I claim is:—

1. A gas meter comprising a body having a central gas measuring chamber, side covers each having a gas measuring chamber, diaphragms each composed of two flexible units of unequal diameters, the larger units suspended between the side covers and body, said units having central openings, and means for connecting the units at the margins of said openings.

2. A gas meter comprising a body having a central gas measuring chamber, side covers having gas measuring chambers, diaphragms each composed of two flexible units of unequal diameters and each having a central opening, the larger units suspended between the side covers and body, said units connected at the margins of said central openings, metal plates for the smaller units, pivotally supported levers connected to said plates to maintain alignment between the larger and smaller units, and crank shaft mechanism pivotally connected to said plates.

In testimony whereof I affix my signature.

OTTO GOLDKAMP.